(12) United States Patent
Babel et al.

(10) Patent No.: US 10,207,331 B2
(45) Date of Patent: Feb. 19, 2019

(54) TOOL HOLDER WITH FLUID SUPPLY

(71) Applicant: Bilz Werkzeugfabrik GmbH & Co. KG, Ostfildern (DE)

(72) Inventors: Gerhard Babel, Baltmannsweiler (DE); Ulrich Zierer, Reutlingen (DE)

(73) Assignee: BILZ WERKZEUGFABRIK GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/480,815

(22) Filed: Apr. 6, 2017

(65) Prior Publication Data

US 2017/0232566 A1 Aug. 17, 2017

Related U.S. Application Data

(63) Continuation of application No. PCT/EP2015/067818, filed on Aug. 3, 2015.

(Continued)

(30) Foreign Application Priority Data

Oct. 7, 2014 (DE) .................... 20 2014 104 802 U

(51) Int. Cl.
  *B23B 31/02* (2006.01)
  *B23B 31/117* (2006.01)
  *B23Q 11/10* (2006.01)

(52) U.S. Cl.
  CPC .......... *B23B 31/1179* (2013.01); *B23B 31/02* (2013.01); *B23B 31/028* (2013.01);
  (Continued)

(58) Field of Classification Search
  CPC ............... B23B 31/028; B23B 31/1179; B23B 2231/24; B23Q 11/1023; Y10T 279/17111; Y10T 279/3487
  See application file for complete search history.

(56) References Cited

U.S. PATENT DOCUMENTS 4,955,764 A * 9/1990 Reinauer ................. B23B 51/06
  279/20
5,020,946 A * 6/1991 Nann .................... B23B 31/202
  277/644

(Continued)

FOREIGN PATENT DOCUMENTS

DE        33 19 618 A1   12/1984
DE   10 2008 062 111 A1   6/2010

(Continued)

OTHER PUBLICATIONS

DIN 69090-3; MQP processing technology—Part 3: Tools and tool systems (English language abstract included); Jul. 2011; 34 pp.

(Continued)

*Primary Examiner* — Eric A Gates
(74) *Attorney, Agent, or Firm* — Harness, Dickey & Pierce, P.L.C.

(57) ABSTRACT

A tool holder is disclosed for holding a tool shaft of a tool, the tool holder having a receiving bore for receiving the tool shaft in a predetermined axial position, having a seal at an inner end of the receiving bore, and further comprising a coolant supply from a machine-side into a bore of the tool shaft, wherein the seal has an at least partially elastically deformable sealing element.

14 Claims, 2 Drawing Sheets

Related U.S. Application Data

(60) Provisional application No. 62/066,539, filed on Oct. 21, 2014.

(52) U.S. Cl.
CPC ...... B23Q 11/1023 (2013.01); *B23B 2231/24* (2013.01); *B23B 2250/12* (2013.01); *B23B 2260/126* (2013.01); *Y10T 279/17111* (2015.01); *Y10T 279/3487* (2015.01)

(56) References Cited

U.S. PATENT DOCUMENTS

| | | | | |
|---|---|---|---|---|
| 5,402,696 | A * | 4/1995 | Hecht | B23Q 1/0036 279/20 |
| 5,405,220 | A * | 4/1995 | Ishikawa | B23B 31/202 279/20 |
| 5,649,714 | A * | 7/1997 | Uchida | B23B 31/00 279/20 |
| 5,922,941 | A | 7/1999 | Winkler et al. | |
| 5,992,860 | A | 11/1999 | Marquart | |
| 7,160,067 | B2 * | 1/2007 | Perry | B23B 31/02 279/43.5 |
| 7,192,228 | B2 * | 3/2007 | Haenle | B23B 31/028 279/156 |
| 7,896,591 | B2 * | 3/2011 | Stoll | B23B 31/1179 409/136 |
| 8,360,695 | B2 * | 1/2013 | Haenle | B23B 31/028 279/20 |
| 8,505,893 | B2 * | 8/2013 | Haimer | B23B 31/005 269/309 |
| 2006/0159529 | A1 | 7/2006 | Haenle et al. | |
| 2008/0185793 | A1 * | 8/2008 | Haimer | B23B 31/028 279/2.06 |
| 2011/0169230 | A1 * | 7/2011 | Babel | B23B 31/008 279/20 |
| 2012/0074655 | A1 | 3/2012 | Aygun | |
| 2012/0189397 | A1 * | 7/2012 | Bozkurt | B23B 31/02 409/135 |
| 2012/0211950 | A1 * | 8/2012 | Matheis | B23B 31/028 279/20 |
| 2013/0015627 | A1 * | 1/2013 | Herud | B23B 31/028 279/2.01 |
| 2013/0328275 | A1 | 12/2013 | Haimer | |

FOREIGN PATENT DOCUMENTS

| | | | |
|---|---|---|---|
| DE | 10 2009 030 514 A1 | 1/2011 | |
| EP | 0 799 670 A1 | 10/1997 | |
| EP | 0 830 917 A | 3/1998 | |
| EP | 1808246 A2 * | 7/2007 | ........... B23B 29/046 |
| EP | 2 343 144 A1 | 7/2011 | |
| JP | 08118119 | 5/1996 | |
| JP | 10138024 | 5/1998 | |
| JP | 2002346864 | 12/2002 | |
| WO | WO2005/037484 A2 | 4/2005 | |

OTHER PUBLICATIONS

International Preliminary Report Report on Patentability (Chapter II) for PCT/EP2015/067818; dated Apr. 13, 2017; 6 pp.
International Search Report/EP2015/067818; dated Oct. 12, 2015; 3 pp.

* cited by examiner

TOOL HOLDER WITH FLUID SUPPLY

CROSS-REFERENCES TO RELATED APPLICATIONS

This application is a continuation of international patent application PCT/EP2015/067818, filed on Aug. 3, 2015 designating the U.S., which international patent application has been published in German language and claims priority from German utility model application 20 2014 104 802.2, filed on Oct. 7, 2014 and from U.S. provisional patent application 62/066,539 filed on Oct. 21, 2014. The entire contents of these priority applications are incorporated herein by reference.

BACKGROUND OF THE INVENTION

The invention relates to a tool holder for receiving a tool at its tool shaft, comprising a receiving bore for receiving the tool shaft in a predetermined axial position, further comprising a sealing at the inner end of the receiving bore, and a coolant supply from the machine side into a bore of the tool shaft.

Such a prior art is known for example from WO 2005/037484 A2.

To this end a tool holder for receiving a tool at its tool shaft comprises a receiving bore within which the tool shaft is held, a sealing configured as an adjusting screw, whereby the axial position of the tool shaft can be precisely adjusted. To this end the adjusting tool comprises a sealing surface facing the tool to which a respective counter surface at the tool shaft is assigned so that a mechanical sealing is realized. However, such a sealing is only effective when the adjusting screw is pressed against the tool with sufficiently high pressure. If the pressure bias is insufficient, then at the connection between the adjustment screw and the tool a leaky point is generated at which the coolant escapes from the tool holder and is not guided any longer or not guided sufficiently into the bore of the tool shaft.

Such tool holders having an inner passage way for the coolant are used for a so-called minimum quantity lubrification MQL. Herein the coolant is guided through the tool holder and the assigned bore within the tool shaft directly to the working location to effect an effective cooling, or lubrification, respectively, at the working location.

Even when throughout this application only "coolant" is mentioned, than this generally is understood as any kind of coolant or lubrification agent, in liquid, gaseous or mixed form, in particular the form of an aerosol.

Important for a correct functioning of the minimum quantity lubrification MQL is the quality of the sealing between the tool shaft and the adjusting screw, since in case of a leakage a sufficient coolant supply to the tool is not ensured.

Since the tool usually is secured within the receiving bore of the tool holder by force-fit, for instance by thermal shrinkage, either the predetermined axial position of the tool shaft must be correctly determined already during shrinking, or subsequently by setting the adjusting screw an adjusting to the specified nominal dimension must be effected.

However, the necessary pressure bias between the sealing surface of the adjusting screw and the tool shaft is critical and partially depends on the ability of the worker during the tool mounting.

Consequently, in practice again and again insufficiently sealed tools or longitudinally not correctly adjusted tools result.

SUMMARY OF THE INVENTION

In view of this, it is a first object of the invention to disclose a tool holder being suitable for a minimum quantity lubrification and that ensures in any event a safe sealing at the transition between the tool holder and the tool shaft at the inner end of the receiving bore.

It is a second object of the invention to disclose a tool holder that is failure-tolerant, if possible so that a safe sealing is effected by an adjusting screw that does not depend from meeting a predetermined pressure bias.

It is a third object of the invention to disclose a tool holder that allows for determining leakages of minimum quantity lubrification within the region of the tool holder.

According to one aspect of the invention, these and other objects are solved by a holder for receiving a tool at a tool shaft thereof, the tool holder comprising:

a receiving bore for receiving the tool shaft within a predetermined axial position;

a central bore arranged within the tool for feeding coolant toward said tool shaft;

a sealing arranged at an inner end of said receiving bore, said sealing comprising an at least partially elastically deformable sealing element protruding into said receiving bore for sealing with an axial end of a tool shaft received within said central bore.

The object of the invention is fully solved in this way.

Due to the elastically deformable sealing element, a safe sealing against the tool shaft is ensured with a small pressure bias already, since the elastically deformable sealing element rests against the tool shaft. In this way, the system is clearly more tolerant against variations of the pressure bias than would be the case with prior art tool holders. Even a small pressure bias is sufficient to ensure a safe sealing.

If, for instance, the tool shaft is shrink-fit within the receiving bore, such as for instance known from EP 0 830 917 A1 which is fully incorporated by reference herewith, than the pressure bias which results from the tool falling into the thermally enlarged receiving bore under gravitational force, is fully sufficient to ensure a safe sealing.

According to another aspect of the invention, the sealing is configured as a plug comprising a central coolant passage being held in a predetermined mounting position at the end of the receiving bore. In this way before inserting the tool shaft into the receiving bore the plug can be adjusted to the desired axial mounting position so that after clamping the tool shaft, such as by thermal shrinkage, the desired axial position of the tool shaft as well as a reliable receiving are ensured.

According to another aspect of the invention, the plug is held adjustably by means of a male thread secured adjustably within a female thread of the tool holder. This facilitates an adjustment for a predetermined axial mounting position of the tool shaft.

In a further development of the invention, the plug at its end facing the tool shaft comprises a sealing element protruding to the outside. Thereby the desired elasticity of the sealing for sealing with the tool shaft is ensured already at a very low pressure bias.

In a preferred development of the invention, the at least partially deformable sealing element consists of an elastomeric plastic material. Thereby a particularly high elasticity and a particularly effective sealing with the tool shaft results already at very low pressure bias. It will be understood that the elastomeric plastic material must be sufficiently thermally stable to resist possible thermal loads in particular during a thermal shrinkage of the tool shaft. It will be further understood that the term "elastomeric plastic material" comprises any plastic material having an at least partially reversible elastic behavior, which includes rubber and rubber-like materials as well. Possibly the elastically deformable sealing element may be made of fluororubber.

According to a further design of the invention, the plug in total consists of an elastomeric plastic material. This allows for a simple and cost-effective manufacture.

According to a further modification of the invention, the plug comprises a base body made of metal being configured as a screw with a male thread, whereon at the end facing the tool shaft there is received the at least partially elastically deformable sealing element made of an elastomeric plastic material. Although this design of the sealing in the form of a metal-plastic-composite part leads to slightly increased manufacturing costs for the sealing, however a particular advantage results by means of an adjusting possibility for the axial position of the tool holder shaft together with a simultaneous tolerance of the effectiveness of the sealing against variations of the axial position.

According to a further development of the invention, the at least partially elastically deformable sealing element comprises a metal which is preferably provided with a coating from a plastic material. In this way a higher tolerance of the sealing effectiveness against an increased pressure bias can be ensured.

In a further development of the invention, the sealing element comprises at least one sealing lip protruding into an undercut provided at the end of the receiving bore. In this way the effectiveness of the sealing is improved.

According to a further development of the invention, the sealing element comprises two sealing lips that protrude into the undercut. Thereby the effectiveness of the sealing is still further improved.

In a preferred development of the invention, the sealing element comprises a first sealing lip for sealing with a shoulder at the end of the receiving bore.

In a further development of the invention, the sealing element comprises a second sealing lip for sealing with an end of the tool shaft. Preferably, the two sealing lips are connected with each other via a concave annular groove. The effectiveness of the sealing is further improved by these measures.

In a preferred development of the invention, the plug at its first end facing the tool shaft comprises a first tool receptacle for applying a screwing tool. This allows to screw-in the plug into the receiving bore from the tool side.

In a further development of the invention the plug at its second end facing the machine side comprises a second tool receptacle for receiving a screwing tool. Thereby after clamping a tool with its tool shaft within the receiving bore an adjusting of the plug is made possible, e.g. for adjusting the axial position of the tool.

According to another aspect of the invention there is disclosed a tool holder for receiving a tool at a tool shaft thereof, said tool holder comprising:

a tool holder body comprising a receiving bore for receiving said tool shaft within a predetermined axial position;

a central bore arranged within said tool holder body for feeding coolant toward said tool shaft;

a sealing arranged at an inner end of said receiving bore;

a coolant lance being sealed against said tool holder body for feeding coolant into a central bore of said tool shaft; and a control bore arranged within said tool holder leading from said receiving bore to the outside for detecting a leakage.

By means of the control bore that can be accessed from the outside and that communicates with the receiving bore it can be detected in a simple way, whether the sealing between the coolant supply and the tool shaft is completely tight, or whether coolant may escape at this point.

Preferably the control bore yields in the region of an undercut that is provided for receiving an axial adjusting screw.

If the sealing by means of the sealing between the adjusting screw and the axial end of the tool shaft is tight, then no coolant escapes into the undercut. However, if here is a certain leakage, then coolant will escape through the cavity formed by the undercut, and therefrom into the control bore.

In a suitable development of the invention, at the control bore there is provided a sensor so that a leakage can be detected directly and can possibly be utilized for outputting a warning signal.

As mentioned above already, the tool holder preferably is configured for receiving a tool in shrink-fit.

For facilitating the mounting of the plug within the receiving bore of the tool holder, it has been found to be advantageous, to utilize an insertion tool having at its outer end a screwdriver tool receptacle by means of which the plug can be screwed into a thread of the tool holder.

In a preferred development of the invention, at the insertion tool there is provided a control feature for determining the axial mounting position of the plug. This may possibly be a step, a shoulder or similar, whereby in connection with a certain feature of the tool holder, e.g. by a front surface of the tool holder, the axial mounting position of the plug within the tool holder may be adjusted precisely.

In an additional development of the invention, at the insertion tool a centering mandrel is provided which is configured for engaging within the plug for ensuring a safe centering of the plug.

It will be understood that the aforementioned features and the features of the invention to be explained hereinafter cannot only be used in the given combination, but also in different combinations or independently without departing form the scope of the invention.

BRIEF DESCRIPTION OF THE DRAWINGS

Further features and advantages of the invention can be taken from the subsequent description of preferred embodiments with reference to the drawings. In the drawings show.

DESCRIPTION OF PREFERRED EMBODIMENTS

Figure 1:
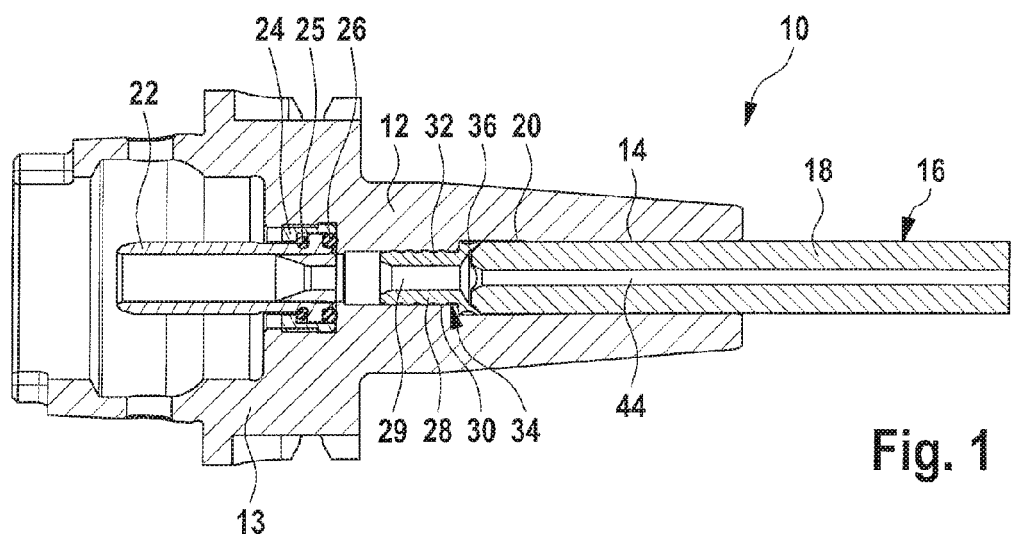
FIG. 1 a longitudinal section through a tool holder according to the invention including an inserted tool.

FIG. 1 shows a cross sectional representation of a tool holder according to the invention designated in total with numeral 10.

The tool holder 10 comprises a tool holder body 12, having a clamping cone on the tool side for receiving a tool 16 in thermal shrink-fit. On the machine side, the tool holder 10 in the generally known way comprises a securing section 13 comprising an annular flange including a peripheral groove allowing for an automatic handling by means of a tool changer or similar.

For receiving the tool 16 within the tool holder body 12, a receiving bore 14 is provided which is configured for receiving a tool shaft 18 by force-fit in generally known way by means of thermal shrinking.

Adjacent to the receiving bore 14, a plug 28 made of an elastomeric or plastic material is screwed with a male thread 30 into an assigned female thread 32 of the tool holder body 12. The plug 28 comprises a sealing element 36 the diameter of which is enlarged with respect to the remaining part of the plug 28 and which protrudes into the end of the receiving bore 14, as will be subsequently explained in more detail with respect to FIG. 2.

The plug 28 comprises a central coolant passage 29 to allow a passage of coolant fed from the machine side into a central bore 44 of the tool holder shaft 18 by means of minimum quantity lubrification.

The respective coolant is fed from the machine side by means of a coolant lance 22 which is screwed into the tool holder body 12 by means of a threaded connection 24 and which is sealed against the tool holder body 12 by means of suitable sealing elements configured as sealing rings 25, 26. Thus, a tight feeding of the coolant via the coolant lance 22 up to the coolant passage 29 of the plug 28 results.

Now according to the invention, the plug 28 is sealed with respect to the axial end of the tool shaft 18 as will be subsequently explained in more detail with reference to FIG. 2.

Figure 2:
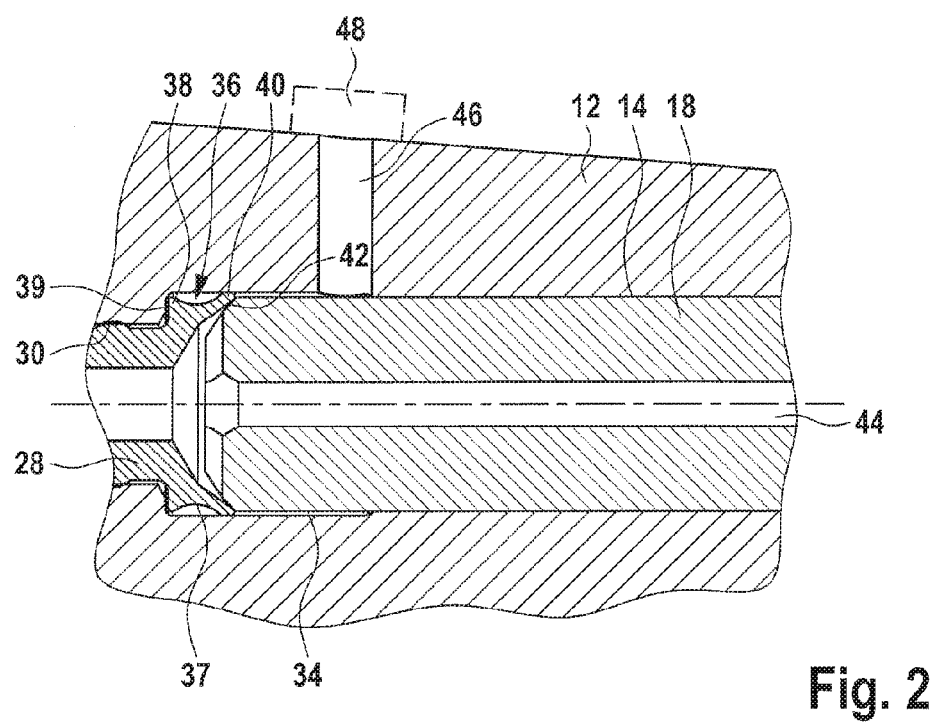
FIG. 2 an enlarged cross-sectional representation of the tool holder according to FIG. 1, shown in the region of the axial end of the tool holder shaft and the plug according to FIG. 1, wherefrom the construction of the sealing can be seen in more detail.
Figure 3:
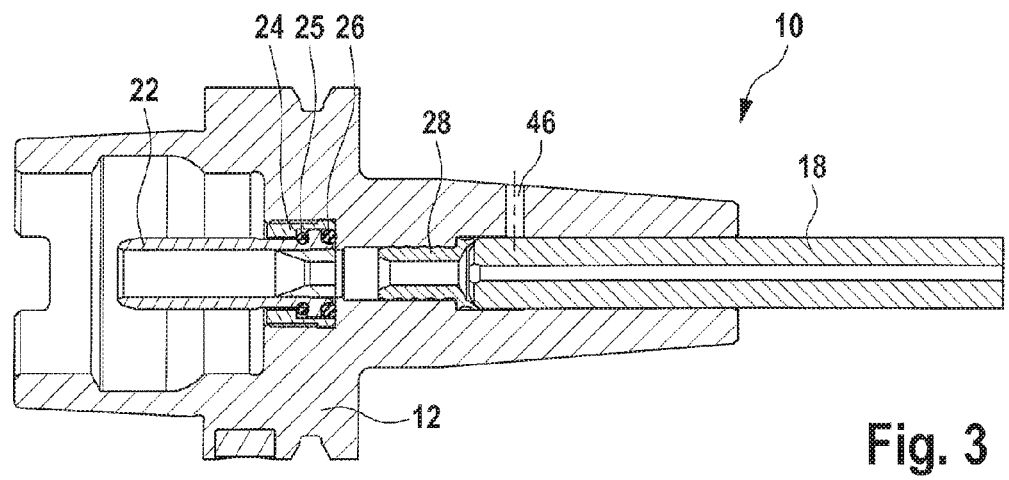
FIG. 3 a longitudinal section through the tool holder according to FIG. 1, however shown with a different sectional plane running through a control bore.

According to FIG. 2 a first sealing lip 38 and a second sealing lip 40 are formed at the sealing element 36 of the plug 28. The first sealing lip is configured for resting against a shoulder 39 of the receiving bore 14 forming the inner end of the receiving bore.

The second sealing lip 40 protrudes with respect to the first sealing lip 38 into the direction of the tool shaft 18 and has a somewhat larger diameter than the first sealing lip 38 so that a resting against the inner surface in the region of the undercut 34 results, whereby the diameter is somewhat enlarged at the inner end of the receiving bore 14. The two sealing lips 38, 40 are connected with each other by means of a concave annular groove 37.

The second sealing lip 40 is configured for direct resting against the slanted end 42 of the tool shaft 18, namely such that the second sealing lip 40 is pressed by the slanted surface 42 of the tool shaft 14 to the outside against the inner surface of the undercut 34, and thus the sealing effect is improved when the tool shaft 18 is pressed into the direction of the machine side.

Thus, a two-fold sealing effect results, namely on the one hand by a resting of the first sealing lip 38 against the shoulder 39 of the receiving bore 14, and on the other hand by a resting of the second sealing lip 40 against the inner surface of the undercut 34 with additional pressure bias by means of the slanted end 42 of the tool shaft 18.

In this way already at a low pressure bias, such as generated by the thermal shrinking of the tool shaft 16 into the tool holder 10, a reliable sealing is ensured at the end 42 of the tool shaft 18.

In FIG. 2, a radial control bore 46 is depicted that yields into the undercut 34. At the outer end of the control bore, in addition a sensor 48 is depicted by a dashed line.

When the sealing is in good order by means of the plug 28, no coolant can escape into the region of the undercut 34.

However, if due to any reason the sealing formed by the sealing element 36 should break down, then this would lead to the escape of coolant into the region of the undercut 34 so that coolant would emerge into the control bore 46, and the coolant escaped could be detected by means of the sensor 48.

Figure 4:
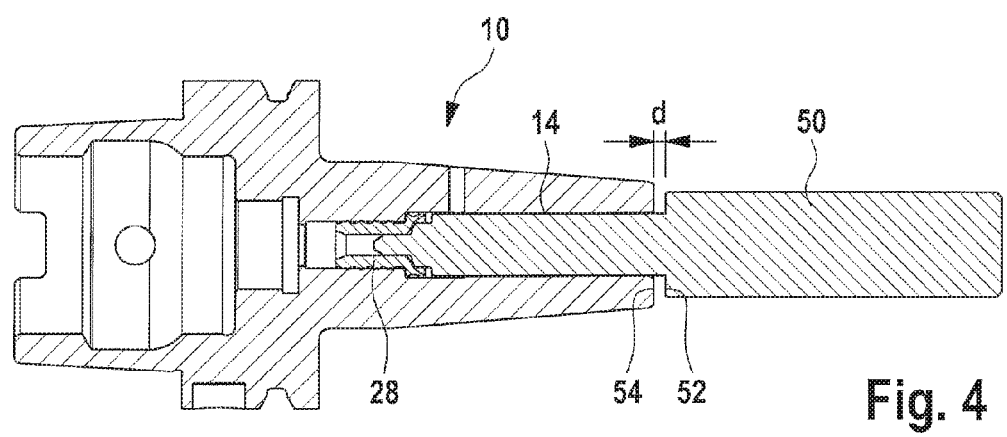
FIG. 4 a longitudinal section through the tool holder according to FIG. 3, wherein in addition an insertion tool for mounting the plug is shown.

In FIG. 4 in addition an insertion tool 50 is depicted by means of which the plug 28 with its male thread 30 can be brought into the assigned female thread 32 of the tool holder body 12 into a desired axial mounting position. For a correct centering of the plug 28 herein, a centering mandrel 53 at the front end of the insertion tool 50 is provided that engages with the central coolant passage 29 of the plug 28.

To ensure a simple adjustment or control, respectively, of the axial mounting position, at the insertion tool 50 a control feature 52 is provided. In the case shown here, the control feature 52 is formed by a shoulder of the insertion tool 50, the distance d of which to the front face 54 of the tool holder 10 yields a control measure. Thus, the plug can be easily adjusted into a desired axial mounting position which determines the later axial position of the tool shaft 18.

Figures 5, 6, 7:
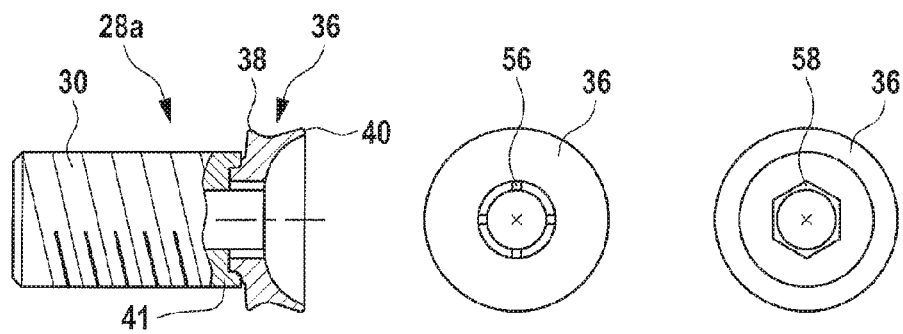
FIG. 5 a partially sectioned side representation of an alternative configuration of the plug according to FIG. 4.
FIG. 6 a view of the plug according to FIG. 5, seen from the right side.
FIG. 7 a view of the plug according to FIG. 5, seen from the left side.

In FIGS. 5 to 7 a variant of the plug is shown which is depicted in total with 28a. Apart from that for corresponding parts corresponding reference numerals are utilized.

The plug 28a comprises a base body 41 made of steel having a male thread 30 for screwing into the female thread 32 of the tool holder body 12. At the tool-side end of the base body 41, the sealing element 36 is provided which is made of an elastomeric plastic material, e.g. fluororubber.

Apart from that, the plug 28a with respect to the shape and design is completely the same as the plug 28 described above.

By designing the plug 28a as a two-component-part, a later adjusting possibility also after shrink-fitting the tool 16 into the receiving bore 14 results, wherein the sealing with the tool end 42 is fully maintained via a wide adjusting region.

The representation according to FIG. 6 shows a screwdriver receptacle 56 for screwing the plug 28a into the female thread 32 of the tool holder body 12 from the tool side.

The view according to FIG. 7 on the opposite side of the plug 28a shows a screwdriver receptacle 58 configured as a hexagon socket which allows for a subsequent adjusting of the plug 28a even after a shrinking of the tool 16 within the receiving bore 14.

What is claimed is:

1. A tool holder defining a rotational axis for receiving a tool at a tool shaft thereof, said tool holder comprising:
   a receiving bore for receiving said tool shaft within a predetermined axial position;
   a sealing provided at an inner end of said receiving bore;
   a coolant feeding canal leading into a central bore of said tool shaft from a machine-side;

wherein said sealing being held at an end of said receiving bore in a predetermined mounting position is configured as a plug comprising a central coolant passage;

wherein said plug comprises a male thread held axially adjustably within a female thread of said tool holder;

wherein said plug comprises a first end facing said tool shaft, said plug at said first end further comprising at least one partially elastically deformable sealing lip made of an elastomeric plastic material protruding into an undercut at an inner end of said receiving bore, said plug being adjustable in said axial direction by rotating said male thread within said female thread into a predetermined mounting position within said receiving bore.

2. The tool holder of claim 1, wherein said plug in total consists of an elastomeric plastic material.

3. The tool holder of claim 1, wherein said plug comprises a base body made of a metal being configured as a screw having a male thread, said screw having an outside end holding an at least partially elastically deformable sealing element made of an elastic plastic material.

4. The tool holder of claim 1, wherein said at least partially elastically deformable sealing element comprises a metal.

5. The tool holder of claim 4, wherein said sealing element comprises a coating made of a plastic material.

6. The tool holder of claim 1, wherein said sealing element comprises two sealing lips protruding into said undercut.

7. The tool holder of claim 6, wherein said sealing element comprises a first sealing lip for sealing with a shoulder arranged at the end of said receiving bore.

8. The tool holder of claim 7, wherein said sealing element comprises a second sealing lip for sealing with an end of said tool shaft.

9. The tool holder of claim 6, wherein said two sealing lips are connected with each other by means of a concave annular groove.

10. The tool holder of claim 1, wherein said plug at a first end facing outwardly comprises a first tool receptacle for receiving a screwdriver tool.

11. The tool holder of claim 10, wherein said plug at a second machine-side end comprises a second tool receptacle for receiving a screwdriver tool.

12. The tool holder of claim 1 being configured for receiving a tool within a shrink-fit.

13. A tool holder for receiving a tool at a tool shaft thereof, said tool holder comprising:

a tool holder body comprising a receiving bore for receiving said tool shaft within a predetermined axial position;

a central bore arranged within said tool holder body for feeding coolant toward said tool shaft;

a sealing arranged at an inner end of said receiving bore;

a coolant lance being sealed against said tool holder body for feeding coolant into a central bore of said tool shaft;

a control bore arranged within said tool holder leading from said receiving bore to the outside for detecting a leakage; and a sensor being connected to said control bore.

14. The tool holder of claim 13, wherein said control bore yields within a region of an undercut that is configured for receiving an axial adjusting screw.

\* \* \* \* \*